US 9,941,739 B2

(12) United States Patent
Oda (10) Patent No.: US 9,941,739 B2
(45) Date of Patent: Apr. 10, 2018

(54) PROCESS BUS ASSOCIATED PROTECTIVE CONTROL SYSTEM, MERGING UNIT, AND CALCULATION DEVICE (71) Applicant: MITSUBISHI ELECTRIC CORPORATION, Chiyoda-ku, Tokyo (JP)

(72) Inventor: Shigetoo Oda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 282 days.

(21) Appl. No.: 14/762,017

(22) PCT Filed: May 21, 2013

(86) PCT No.: PCT/JP2013/064034
§ 371 (c)(1),
(2) Date: Jul. 20, 2015

(87) PCT Pub. No.: WO2014/188507
PCT Pub. Date: Nov. 27, 2014

(65) Prior Publication Data
US 2015/0318739 A1 Nov. 5, 2015

(51) Int. Cl.
*H02J 13/00* (2006.01)
*G05B 15/02* (2006.01)
(Continued)

(52) U.S. Cl.
CPC .............. *H02J 13/00* (2013.01); *G05B 15/02* (2013.01); *H02H 1/0061* (2013.01); *H02H 3/05* (2013.01);
(Continued)

(58) Field of Classification Search
CPC ........ H02J 13/00; H02J 13/0062; H02H 3/05; H02H 7/26; H02H 7/261; H02H 1/0061;
(Continued)

(56) References Cited

U.S. PATENT DOCUMENTS 7,746,791 B2 * 6/2010 Wimmer ................. H04L 41/12
370/242
7,882,220 B2 * 2/2011 Wimmer ................. H02J 13/00
709/223
(Continued)

FOREIGN PATENT DOCUMENTS

JP 1-170312 A 7/1989
JP 2002-315233 A 10/2002
(Continued)

OTHER PUBLICATIONS

Extended European Search Report dated Dec. 15, 2016 issued in corresponding European Patent Appln. No. 13885317.1 (7 pages).
(Continued)

*Primary Examiner* — Charles Kasenge
(74) *Attorney, Agent, or Firm* — Buchanan Ingersoll & Rooney PC (57) ABSTRACT A protective control system includes an IED (Intelligent Electric Device) and a merging unit. The merging unit receives a current/voltage waveform signal of a power system, and outputs a digitally converted analog data to a process bus via a communication line as a serial signal. The IED is configured to be capable of transmitting a trip instruction to the merging unit using both the process bus and a station bus. The trip instruction is for outputting the trip signal. Preferably, each of the merging unit and the IED includes a switching circuit that makes switching to the station bus when an error is detected in the process bus communication. In the event of the process bus error, communication made by the process bus is switched to
(Continued)

communication made by the station bus. Accordingly, reliability of the process bus can be improved.

9 Claims, 9 Drawing Sheets

(51) Int. Cl.
 *H02H 1/00* (2006.01)
 *H02H 7/26* (2006.01)
 *H02H 3/05* (2006.01)
(52) U.S. Cl.
 CPC .............. *H02H 7/26* (2013.01); *H02H 7/261* (2013.01); *H02J 13/0062* (2013.01); *Y02B 70/3266* (2013.01); *Y02E 60/724* (2013.01); *Y02E 60/725* (2013.01); *Y02E 60/7838* (2013.01); *Y04S 10/18* (2013.01); *Y04S 10/20* (2013.01); *Y04S 20/242* (2013.01); *Y04S 40/124* (2013.01)
(58) Field of Classification Search
 CPC ....... G05B 15/02; Y04S 10/20; Y04S 20/242; Y04S 10/18; Y04S 40/12; Y02E 60/725; Y02E 60/274; Y02E 60/7838; Y02B 70/3266
 See application file for complete search history.

(56) References Cited

U.S. PATENT DOCUMENTS

| | | | | |
|---|---|---|---|---|
| 8,165,841 B2 * | 4/2012 | Vetter | ................... | H04L 43/028 702/122 |
| 8,306,670 B2 * | 11/2012 | Oda | ....................... | H02H 7/261 375/356 |
| 8,433,451 B2 * | 4/2013 | Tournier | ................. | H02H 7/261 700/292 |
| 8,532,944 B2 * | 9/2013 | Vetter | .................. | H02J 13/0006 700/292 |
| 8,886,475 B2 * | 11/2014 | Frei | .................... | G05B 23/0248 702/58 |
| 9,048,697 B2 * | 6/2015 | Wang | ..................... | H02H 7/261 |
| 9,136,697 B2 * | 9/2015 | Werner | ................... | H02H 7/261 |
| 9,166,407 B2 * | 10/2015 | Rietmann | ............... | H02J 3/006 |
| 9,473,384 B2 * | 10/2016 | Hadeli | ................ | H04L 41/0873 |
| 9,478,973 B2 * | 10/2016 | Sundaram | ............. | H02H 7/261 |
| 2002/0116092 A1 | 8/2002 | Hamamatsu et al. | | |
| 2008/0183406 A1 * | 7/2008 | Lee | .................... | G01R 19/2513 702/58 |
| 2008/0244044 A1 * | 10/2008 | Wimmer | ................. | H02J 13/00 709/221 |
| 2010/0060017 A1 | 3/2010 | Oda | | |
| 2011/0112699 A1 * | 5/2011 | Tournier | ................ | H02H 7/261 700/292 |
| 2011/0307114 A1 * | 12/2011 | Kunsman | ............. | G06F 15/167 700/292 |
| 2011/0320058 A1 * | 12/2011 | Rietmann | ............... | H02J 3/006 700/297 |
| 2012/0089262 A1 * | 4/2012 | Wang | ..................... | H02H 7/261 700/286 |
| 2012/0123603 A1 | 5/2012 | Werner et al. | | |
| 2012/0203874 A1 * | 8/2012 | Pamulaparthy | ..... | H02J 13/0017 709/220 |
| 2012/0239320 A1 * | 9/2012 | Frei | .................... | G05B 23/0248 702/58 |
| 2013/0031164 A1 * | 1/2013 | Sundaram | ............. | H02H 7/261 709/203 |
| 2013/0235764 A1 * | 9/2013 | Hadeli | ............... | H04L 41/0873 370/255 |

FOREIGN PATENT DOCUMENTS

| | | |
|---|---|---|
| JP | 2003-235181 A | 8/2003 |
| JP | 2004-282856 A | 10/2004 |
| JP | 2005-318697 A | 11/2005 |
| JP | 2008-295298 A | 12/2008 |
| JP | 2010-068594 A | 3/2010 |
| JP | 2012-249387 A | 12/2012 |
| WO | 2009062535 A1 | 5/2009 |

OTHER PUBLICATIONS

International Search Report (PCT/ISA/210) dated Aug. 20, 2013, by the Japanese Patent Office as the International Searching Authority for International Application No. PCT/JP2013/064034.

* cited by examiner

PROCESS BUS ASSOCIATED PROTECTIVE CONTROL SYSTEM, MERGING UNIT, AND CALCULATION DEVICE

TECHNICAL FIELD

The present invention relates to a process bus associated protective control system, a merging unit, and a calculation device, in particular, a merging unit for measuring a state of a power system to control a circuit breaker.

BACKGROUND ART

Conventionally, a protective relay device has been used to collect information such as current or voltage from a power system and detect and cut off failure from the power system in the event of failure in the power system or power facility.

For example, a conventional digital type protective relay device detects occurrence of system fault by performing A/D (Analog to Digital) conversion onto input current signal or voltage signal (analog signal) and using resulting digital waveform data to perform necessary calculation such as protective relay calculation.

Meanwhile, due to progress in information and communication technology in recent years, networks for facilities associated with the power system have been established. For such an exemplary network, a distributed type protective control system has been in practical use. In the distributed type protective control system, functions of the conventional protective relay device are distributed and one or more merging units are typically provided to collect information such as current or voltage from the power system.

A merging unit generates a digital signal through A/D conversion of an input current signal or voltage signal (analog signal), converts the generated digital signal into serial data, and outputs it via a communication line. Based on the serial data, determination as to occurrence of system fault or the like is performed by an intelligent electric device (hereinafter, also referred to as IED), which is a calculation device connected thereto through the communication line.

A protocol of telecommunications standard for serial data transmitted to an IED by a merging unit is defined in IEC61850-9-2. Also, it is defined that a signal employing an operation signal of an IED for control of another device is transmitted in the form of a message type GOOSE (Generic Object Oriented System Event) signal, which is a general object oriented system event.

In other words, it is premised to use the GOOSE signal as a control signal for controlling opening and closing of a circuit breaker provided in a substation in accordance with the output signal of the IED. In order to control devices such as the circuit breaker, the following methods are employed: a method in which a current/voltage signal is received from a merging unit, calculation for protection and control is performed by an IED, and a device is directly controlled by a contact point signal from the IED in accordance with the result thereof; and a method in which the signal is transmitted to the merging unit in the form of GOOSE signal and the device is controlled from the merging unit.

The former is a method that is based on the method of the conventional system. The latter is a method employed to reduce cost of wiring a cable to couple the control signal from the IED to the device by controlling it from the merging unit provided near the device.

A prior art employing the latter method to improve reliability in transmission circuit is disclosed in Japanese Patent Laying-Open No. 2002-315233 (Patent Document 1).

This prior art is directed to a system capable of protective interruption even in the event of fault in a process bus or the like by providing two redundant integrated units or merging units, referred to as sensor units, together with transmission paths.

CITATION LIST

Patent Document

PTD 1: Japanese Patent Laying-Open No. 2002-315233 (paragraphs 0079 to 0081 and 0343 to 0345 as well as FIG. 40)

SUMMARY OF INVENTION

Technical Problem

In the prior art, since communication between the merging unit and the IED cannot be made when there is a problem in the process bus, the two process bus communication paths are provided to secure reliability. This method provides high reliability but disadvantageously results in high cost because the two process bus communication paths are provided.

The present invention has been made to solve the problem and has an object to provide a process bus associated protective control system, a merging unit, and a calculation device so as to achieve high reliability while suppressing increase in cost.

Solution to Problem

An aspect of the present invention is directed to a process bus associated protective control system, including: a merging unit that receives an analog signal indicating a measured state of a power system, that converts the analog signal into a digital signal, and that outputs a trip signal for controlling a circuit breaker provided in the power system; a calculation device that determines a state of the trip signal based on the digital signal converted by the merging unit; a substation automation system device that performs at least one of monitoring and instructing; a process bus that connects the merging unit and the calculation device to each other; and a station bus that connects the merging unit, the calculation device, and the substation automation system device to one another. The process bus and the station bus are communication transmission paths independent from each other. The calculation device is configured to be capable of transmitting a trip instruction to the merging unit through both the process bus and the station bus, the trip instruction being for outputting the trip signal.

Advantageous Effects of Invention

According to the present invention, even when there is an error in the process bus between the merging unit and the IED, the system can be configured such that the calculation in the IED can be continued and the control signal based on the calculation result from the IED can be transmitted to the merging unit. Moreover, there is provided a function of implementing, using the station bus, a system in which reliability for the control signal based on the calculation result in the IED is increased in relation to the process bus communication between the merging unit and the IED. Accordingly, a configuration can be implemented which can cope with an error in the process bus without providing two process buses.

DESCRIPTION OF EMBODIMENTS

The following describes the present embodiment with reference to figures. When referring to the number, an amount, or the like in the description of the embodiment, the scope of the present invention is not necessarily limited to the number, the amount, or the like unless otherwise stated particularly. In the description of the embodiment, the same component and corresponding component are given the same reference characters and may not be described repeatedly. Unless particularly limited, it has been initially expected to appropriately use configurations of the embodiment in combination.

First Embodiment

Common Entire System Configuration

Figure 1:
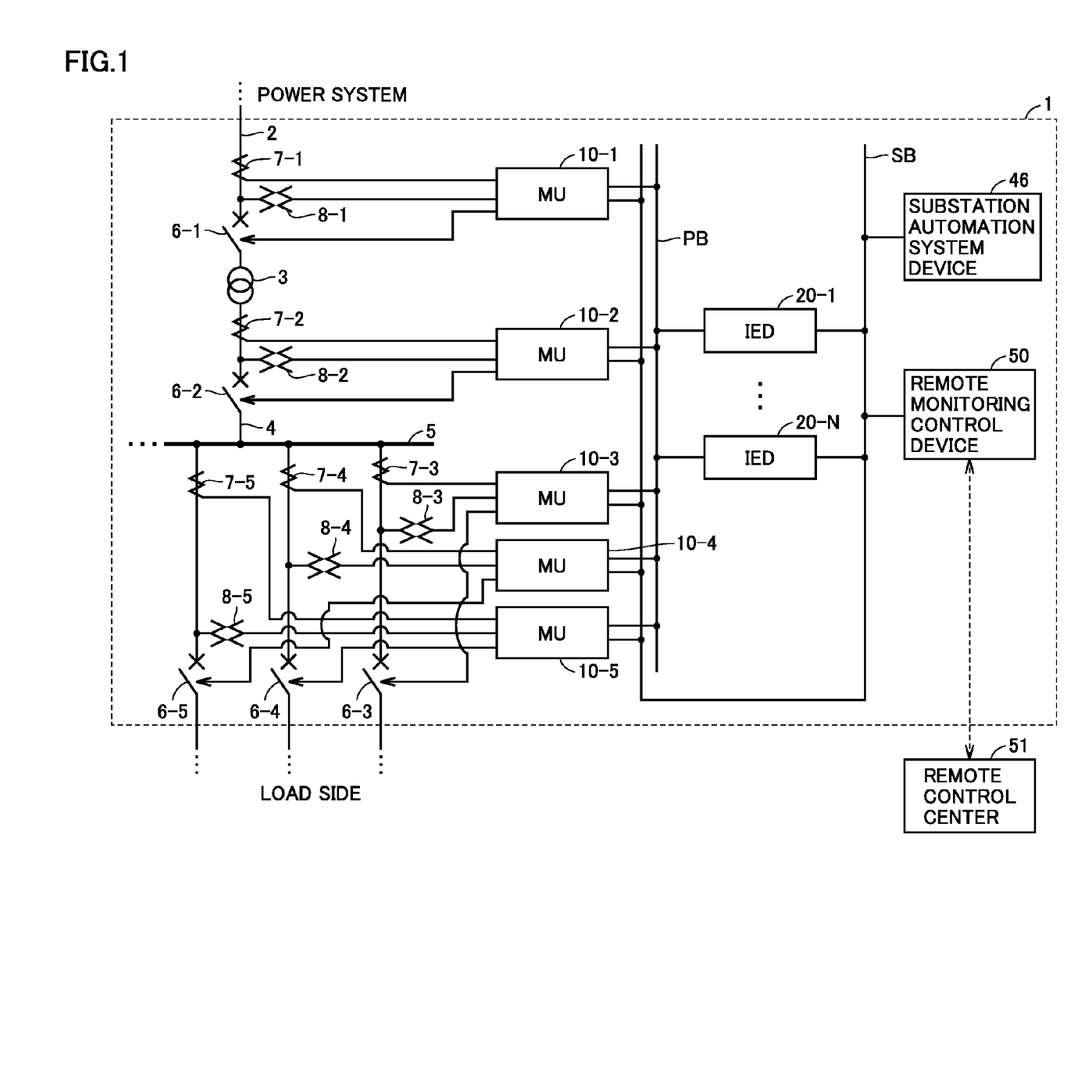
FIG. 1 is a schematic view showing an entire configuration of a protective control system.

FIG. 1 is a schematic view showing an entire configuration of a protective control system.

With reference to FIG. 1, a protective control system 1 is provided in a substation, a power distribution station, or the like, collects information of a power system, and performs processes, such as protection, control, and monitoring of the power system, based on the collected information. More specifically, protective control system 1 includes: a plurality of merging units 10-1 to 10-5 (hereinafter, also collectively referred to as "merging unit 10"), each of which collects information such as current or voltage from the power system; and a plurality of calculation devices (Intelligent Electric Devices; hereinafter, also referred to as "IED") 20-1 to 20-N (hereinafter, also collectively referred to as "IED 20") for protecting, controlling and monitoring the power system.

Generally, in protective control system 1, the plurality of IEDs 20 are provided depending on purposes of use (for example, objects to be protected or controlled). Examples of such IEDs provided depending on purposes of use include: a protective IED implementing a protective function for each object to be protected (such as a protective IED for bus, a protective IED for transformer, or a protective IED for line); and a control IED implementing a control function.

Merging units 10-1 to 10-5 and IEDs 20-1 to 20-N are physically capable of data communication with one another via a process bus PB in accordance with a predetermined protocol. Process bus PB may be configured to transmit data by means of electric signal, but in the present embodiment, it is assumed that process bus PB is configured to transmit serial data by means of an optical signal through an optical fiber. A station bus SB is also configured to transmit serial data by means of an optical signal through an optical fiber, but employs a transmission protocol different from that of process bus PB.

Each merging unit 10 sends, to its corresponding IED 20, information collected from the power system.

Based on the information from each merging unit 10, IED 20 performs a process such as protection, control, or monitoring of the power system.

More specifically, as one example of the protective function, IED 20 determines, for every predetermined period, whether or not a relay calculation logic set in advance is established and outputs, when the relay calculation logic is established, a trip signal to a merging unit that manages a corresponding circuit breaker.

In the present embodiment, this trip signal can be transmitted via either of process bus PB and station bus SB.

Meanwhile, as one example of the control function, IED 20 can output an instruction for closing/opening an opening/closing device in the power system. It should be noted that, in the present specification, the opening/closing device represents a concept including a circuit breaker, a disconnector, and the like.

Meanwhile, as one example of the monitoring function, IED 20 can output a state of current, voltage, or the like of the power system in real time. Moreover, IED 20 is connected to a substation automation system (SAS) device 46 and a remote monitoring control device 50 via station bus SB.

IED 20 can also output the information of the power system to substation automation system device 46, and can also output the information of the power system to a remote control center 51 distant away from the target power facility via remote monitoring control device 50. For example, IED 20 can obtain, from a timer not shown in the figure, time data indicating time at which the relay calculation logic has been established, i.e., time data indicating time at which an error, such as fault, has been detected, and can transmit a fault detection signal, which has the time data attached therewith, to substation automation system device 46 or remote monitoring control device 50 via station bus SB.

Further, IED 20 can be configured to implement any process other than the processes mentioned above. For example, IED 20 may be used to implement a function corresponding to substation automation system device 46.

Moreover, merging unit 10 is also connected to station bus SB, and is configured to be capable of data communication with substation automation system device 46 or remote monitoring control device 50 via station bus SB.

As one example of the power facility, FIG. 1 shows a configuration in which electric power is supplied to the primary side of a potential transformer 3 via a power transmission line 2 included in the power system. The power is subjected to voltage conversion (step-down) by potential transformer 3, and is supplied to a bus 5 via a supply line 4. A plurality of distribution lines are connected to bus 5 and electric power is supplied to a load through each of the distribution lines. Protective control system 1 protects, controls and monitors such an power facility.

Specifically, power transmission line 2 is provided with a circuit breaker 6-1, which is one type of opening/closing device, and is also provided with a current transformer (CT) 7-1 (hereinafter, also collectively referred to as "current transformer 7") and an instrument potential transformer (PT/Voltage Transformer (VT)) 8-1 (hereinafter, also collectively referred to as "potential transformer 8"). Current transformer 7-1 measures information (current waveform) of current flowing in power transmission line 2. Instrument potential transformer 8-1 measures information (voltage waveform) of voltage generated in power transmission line 2. The information measured by each of current transformer 7-1 and instrument potential transformer 8-1 is sent to merging unit 10-1. Further, contact point information, which is binary data (binary signal) for circuit breaker 6-1, is sent to merging unit 10-1 through a communication line not shown in the figure. The binary data is data of two values: 0 represents opened contact point and 1 represents closed contact point. Namely, merging unit 10-1 collects the information of current flowing in power transmission line 2, the information of voltage generated in power transmission line 2, and the contact point information of the opening/closing device such as circuit breaker 6 provided in power transmission line 2. It should be noted that although only the configuration of the circuit breaker is shown in the figures, various opening/closing devices such as a disconnector are provided in the power transmission line.

Similarly, supply line 4 is provided with a circuit breaker 6-2, a current transformer 7-2 and an instrument potential transformer 8-2. Information measured by each of current transformer 7-2 and instrument potential transformer 8-2 is sent to merging unit 10-2. Moreover, contact point information of circuit breaker 6-2 is also sent to merging unit 10-2.

The plurality of distribution lines are connected to bus 5, are respectively provided with circuit breakers 6-3, 6-4, 6-5, and are respectively provided with current transformers 7-3, 7-4, 7-5 and instrument potential transformers 8-3, 8-4, 8-5 to detect failure in corresponding loads or intermediate distribution paths. For respective distribution lines, information measured by current transformers 7-3, 7-4, 7-5 and instrument potential transformers 8-3, 8-4, 8-5 are respectively sent to merging units 10-3 to 10-5. Moreover, the contact point information of circuit breakers 6-3 to 6-5 are also respectively sent to merging units 10-3 to 10-5. Namely, each of merging units 10-3 to 10-5 collects information of current flowing in a distribution line connected to bus 5, information of voltage generated in the distribution line, and contact point information of an opening/closing device such as circuit breaker 6 provided in the distribution line.

Figure 2:
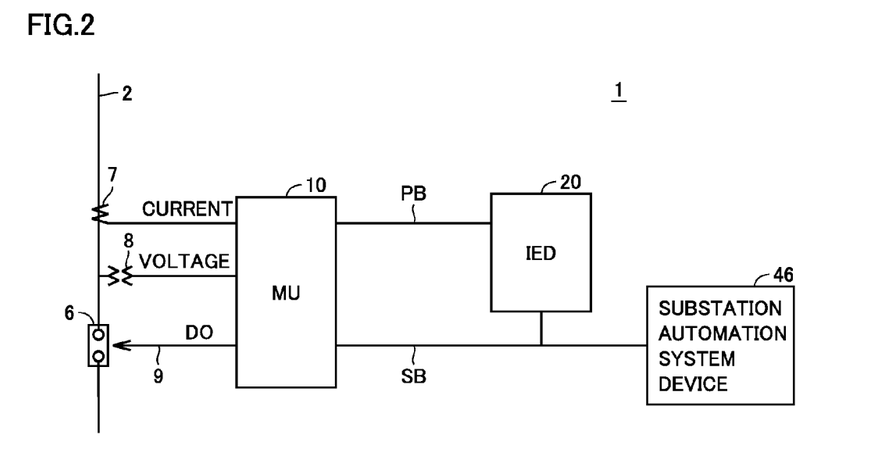
FIG. 2 shows an arrangement of merging units in a power system in accordance with an embodiment of the present application.

FIG. 2 shows an arrangement in the power system of the merging unit according to the embodiment of the present application. In order to facilitate understanding, FIG. 2 shows extraction of the basic configuration regarding one merging unit from FIG. 1.

With reference to FIG. 2, current transformer 7 and instrument potential transformer 8 are disposed on power transmission line (or bus) 2. Each of measurement values measured by current transformer 7 and instrument potential transformer 8 is sent to merging unit 10. Merging unit 10 outputs data, which is obtained by converting the measurement value into a digital value, to the communication path called process bus PB in accordance with a predetermined protocol. The data thus output is sent to IED 20, which performs calculation for protection or control.

When the result of calculation by IED 20 satisfies a predetermined condition for execution of control, IED 20 outputs a control signal. The control signal is transmitted to merging unit 10 via process bus PB, and control for circuit breaker 6 or the like is correspondingly performed in accordance with a contact point output in merging unit 10.

Moreover, internal information of IED 20 including the control signal of IED 20 is coupled to a communication line (referred to as "station bus SB", which is different from process bus PB) connected to upper-level substation automation system device 46. Furthermore, since this station bus SB is also connected to merging unit 10, internal information of merging unit 10 can be also transmitted to substation automation system device 46 or the like.

Furthermore, although not shown in the figure, device information of circuit breaker 6 or the like is collected by merging unit 10 as binary data, and is sent also to IED 20 or substation automation system device 46 via process bus PB or station bus SB.

Thus, the process bus is used to mainly transmit the information of the substation main device, such as the current or voltage of the system or the state of the circuit breaker, to the IED or the like. On the other hand, the station bus is used to connect devices such as the IED and the merging unit to each other and perform control therebetween, or is used to enable substation automation system device 46 to monitor the substation by communicating the information or the like of the devices to substation automation system device 46. Hence, in view of the protection of power transmission line or the like, which is the most important in substation control, the process bus precedes the station bus.

Figure 3:
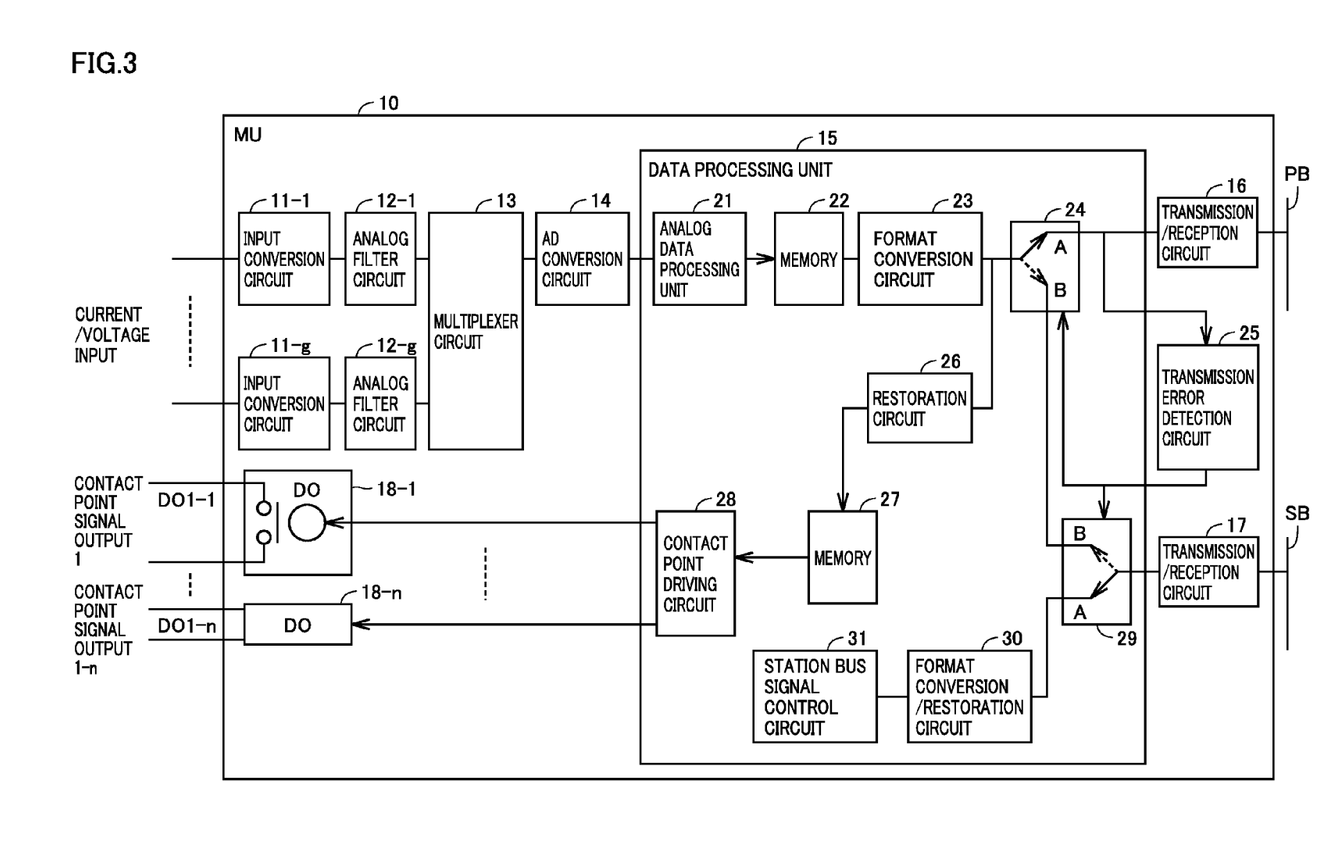
FIG. 3 is a block diagram showing a configuration of a merging unit 10 shown in FIG. 2.

FIG. 3 is a block diagram showing the configuration of merging unit 10 shown in FIG. 2. With reference to FIG. 3, the signal indicating current or voltage waveform from the current transformer or the potential transformer is electrically insulated in an input conversion circuit 11 (11-1 to 11-$g$, where $g$ represents the numbers of analog input channels), and is converted into an appropriate voltage signal in the merging unit. Then, the high frequency component of the voltage signal is removed by an analog filter circuit 12 (12-1 to 12-$g$), and then the voltage signal is sent to a multiplexer circuit 13.

Multiplexer circuit 13 sequentially outputs a plurality of analog input signals to an AD conversion circuit 14. AD conversion circuit 14 sequentially converts the analog input signals corresponding to the number of input channels into digital signals. After the digital conversion, a correction process is performed in an analog data processing unit 21 of a data processing unit 15 with regard to errors having been caused by input conversion circuit 11, analog filter circuit 12, AD conversion circuit 14, and the like. Moreover, analog data processing unit 21 performs a process of conversion from a current or voltage value per sampling amount unit into necessary data as data to be carried on the process bus.

The data processed by analog data processing unit 21 is temporarily stored in a first memory circuit 22, and is then sent to a format conversion circuit 23.

Format conversion circuit 23 performs data conversion in accordance with a protocol specified by the process bus. Then, the data thus converted is sent through the A terminal of a first switching circuit 24, is converted into an optical signal by a transmission/reception circuit 16 that performs the electric-optical conversion, and then is output to process bus PB.

On this occasion, the signal on process bus PB is monitored by a transmission error detection circuit 25. The control signal for merging unit output contact point as transmitted from IED 20 via process bus PB is sent through transmission/reception circuit 16 and the A terminal of first switching circuit 24, is converted into a signal suitable for signal control by a transmission format restoration circuit 26, and is then sent to a second (buffer) memory circuit 27.

The signal temporarily stored in second memory circuit 27 is converted by a contact point driving circuit 28 into a signal for driving a contact point, and then drives an output contact (DO) circuit 18 (18-1 to 18-*n*, where n represents the number of output contact points). Accordingly, devices, such as the circuit breaker of the substation, are controlled. Moreover, a transmission/reception circuit 17, connected to station bus SB, for performing electric-optical conversion is connected to the B terminal of first switching circuit 24 through the B terminal of a second switching circuit 29. Further, the A terminal of second switching circuit 29 is connected to a format conversion/restoration circuit 30.

Here, when no error is detected by transmission error detection circuit 25 in the signal from process bus PB (normal state), the A terminals of first switching circuit 24 and second switching circuit 29 are enabled and the B terminals thereof are disabled. On the contrary, when an error is detected by transmission error detection circuit 25 in the signal from process bus PB (process bus error state), the A terminals of first switching circuit 24 and second switching circuit 29 are disabled and the B terminals thereof are enabled.

Figure 4:
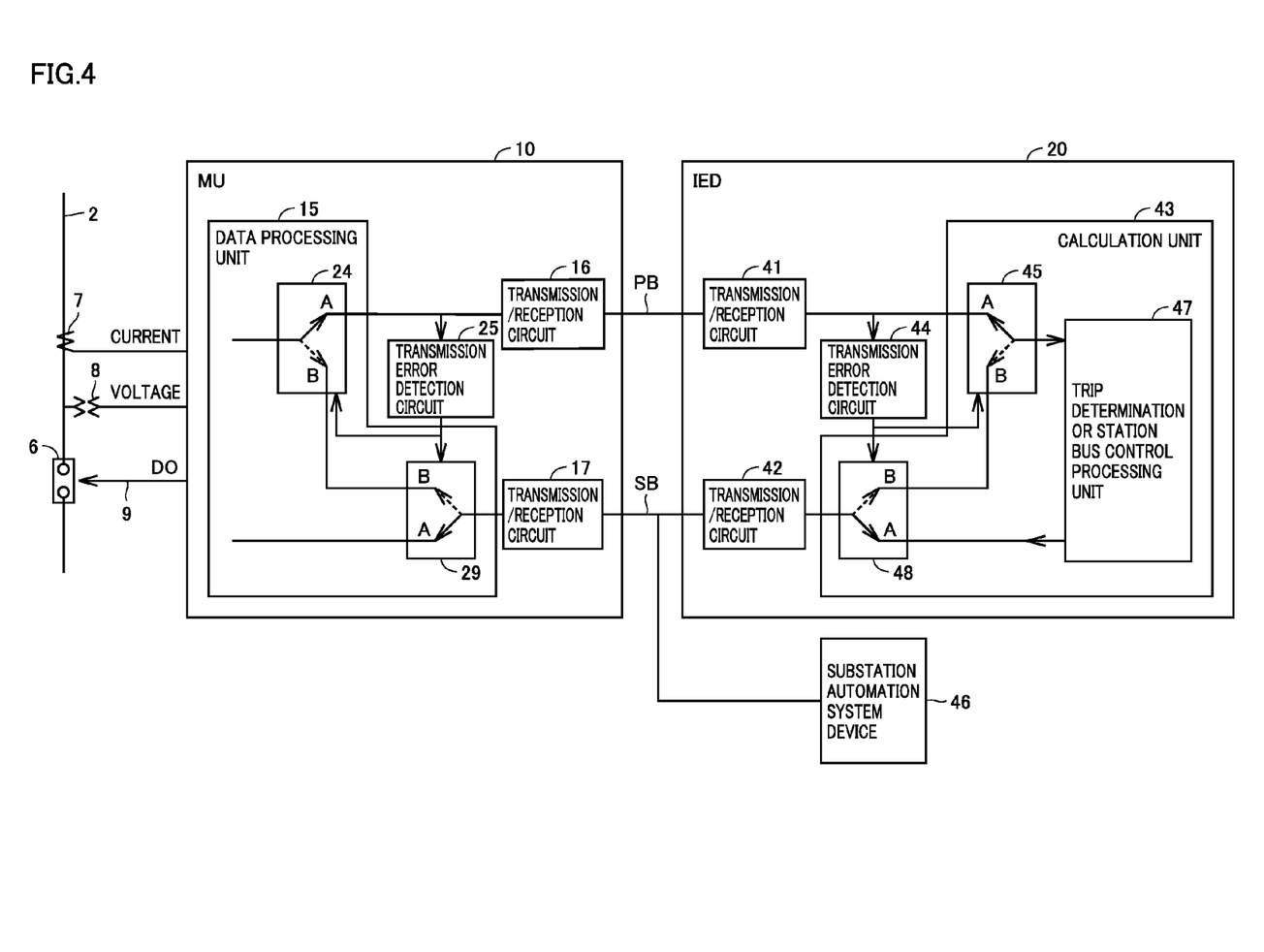
FIG. 4 is a block diagram showing each of connection related portions of merging unit 10 and IED 20.

FIG. 4 is a block diagram showing each of connection related portions of merging unit 10 and IED 20. FIG. 4 illustrates portions of IED 20 in relation to merging unit 10 of FIG. 3.

With reference to FIG. 4, a transmission/reception circuit 41 disposed in IED 20 and connected to process bus PB converts an optical signal received from process bus PB into an electric signal, and then the data is processed by a calculation unit 43. Likewise, a transmission/reception circuit 42 connected to station bus SB converts an optical signal of station bus SB into an electric signal.

The output signal of transmission/reception circuit 41 is monitored by a transmission error detection circuit 44. At the same time, when no error is detected by transmission error detection circuit 44, the output signal of transmission/reception circuit 41 is transmitted via the A terminal of a third switching circuit 45 to a trip determination or station bus control processing unit 47, and a calculation process in the IED is performed.

Moreover, when no error is detected by transmission error detection circuit 44 in the signal from station bus SB, the signal from station bus SB is transmitted to trip determination or station bus control processing unit 47 via the A terminal of a fourth switching circuit 48, and a calculation process in the IED is performed.

Here, when no error is detected by transmission error detection circuit 44 in the signal received via process bus PB (normal state), the A terminals of third switching circuit 45 and fourth switching circuit 48 are enabled and the B terminals thereof are disabled.

On the other hand, when an error is detected by transmission error detection circuit 44 in the signal received via process bus PB (process bus error state), the A terminals of third switching circuit 45 and fourth switching circuit 48 are disabled and the B terminals thereof are enabled.

It should be noted that because process bus PB employs bidirectional transmission, the transmission error can be almost simultaneously detected by merging unit 10 and IED 20, i.e., detected at the both ends of process bus PB.

For example, when there is an error only in the reception by transmission/reception circuit 41 of IED 20, the transmission error cannot be detected by merging unit 10 but is detected by transmission error detection circuit 44 of IED 20 and an error detection signal is transmitted to merging unit 10, whereby the error can be detected also by merging unit 10.

On the other hand, when there is an error only in the transmission by transmission/reception circuit 41, the error can be detected by transmission error detection circuit 25 of merging unit 10, so that a resulting error detection signal is sent to IED 20 via process bus PB, whereby the error can be detected also by IED 20.

Next, with reference to FIG. 3 again, the following describes the operation of merging unit 10. When a received signal from process bus PB is monitored by transmission error detection circuit 25 and no error is detected, the paths associated with the A terminals of first switching circuit 24 and second switching circuit 29 are enabled.

Namely, system current/voltage data is transmitted to IED 20 via process bus PB, the control signal from IED 20 is transmitted to contact point driving circuit 28 via process bus PB as well as restoration circuit 26 and second memory circuit 27 in merging unit 10, and contact point driving circuit 28 drives output contact points 18-1 to 18-*n*.

Moreover, a station bus control circuit 31 is connected to station bus SB via the A terminal of second switching circuit 29 and transmission/reception circuit 17. Station bus control circuit 31 transmits the information of the merging unit to IED 20 or substation automation system device 46 of FIG. 1, receives a request signal therefrom, and performs a certain process.

When transmission error detection circuit 25 detects a transmission error of process bus PB, each of first switching circuit 24 and second switching circuit 29 switches from the connection attained via the A terminal thereof to the connection attained via the B terminal thereof.

Namely, the system current/voltage data is transmitted to IED 20 via station bus SB, the control signal from IED 20 is transmitted to contact point driving circuit 28 via station bus SB as well as restoration circuit 26 and second memory circuit 27 in the merging unit, and contact point driving circuit 28 drives output contact points 18-1 to 18-*n*.

It should be noted that in this case, the original control employing station bus SB is cut off to precede the transmission of the system current/voltage data having been performed via the process bus and the control signal resulting from protection calculation in IED 20 using the system current/voltage data. However, when station bus SB has a sufficient transmission capacity, modification may be made such that in addition to the original control employing station bus SB, control for the protection calculation in IED 20 may be performed via station bus SB as described below.

Meanwhile, the operation of IED 20 is as follows. With reference to FIG. 4 again, when a received signal from process bus PB is monitored by transmission error detection circuit 44 and no error is detected, the connection via the A terminal of each of third switching circuit 45 and fourth switching circuit 48 is enabled.

Specifically, the system current/voltage data transmitted from merging unit 10 via process bus PB is sent to trip determination or station bus control processing unit 47 in calculation unit 43 of IED 20 via third switching circuit 45 and is subjected to a calculation process therein. Moreover, the station bus signal sent from merging unit 10 or substation automation system device 46 via station bus SB is sent to trip determination or station bus control processing unit 47 in calculation unit 43 via third switching circuit 45 and is subjected to a calculation process therein.

When the transmission error of process bus PB is detected, transmission error detection circuit 44 switches each of third switching circuit 45 and fourth switching circuit 48 to the connection attained via the B terminal thereof. Specifically, the system current/voltage data transmitted from merging unit 10 via station bus SB is sent to trip determination or station bus control processing unit 47 in calculation unit 43 via third switching circuit 45, and is subjected to a calculation process therein.

Moreover, station bus control circuit 31 of merging unit 10 in FIG. 3 has been already cut off from station bus SB. Therefore, the information from station bus control circuit 31 does not reach IED 20 and substation automation system device 46. Moreover, the data of voltage/current information from merging unit 10 does not reach substation automation system device 46 because the destination of transmission is designated as IED 20.

Before the switching of switching circuits 29, 48, substation automation system device 46 can transmit/receive a signal to/from merging unit 10 and IED 20. Hence, when merging unit 10 or IED 20 is configured to switch switching circuits 29, 48 after reporting the error state of process bus PB to substation automation system device 46, substation automation system device 46 can recognize the error state of process bus PB. Therefore, while there is an error in transmission, substation automation system device 46 restricts control employing station bus SB and performed from substation automation system device 46.

Specifically, when there is an error in process bus PB, switching can be made to station bus SB to precede the transmission of system current/voltage data and the control signal resulting from protection calculation in IED 20 using the system current/voltage data.

It should be noted that in the present embodiment, the system is configured such that switching is made to station bus SB when there is an error in process bus PB and such that the original monitoring control in the station bus is stopped (cut off) in order to precede the transmission of system current/voltage data and the control signal resulting from protection calculation in IED 20 using the system current/voltage data. However, the cutting off is not particularly required when the transmission rate of station bus SB has room for data transmission of station bus signal in addition to the original data transmission in the communication of process bus PB. Moreover, only certain monitoring control may be permitted depending on the transmission rate of the station bus and a priority in the original monitoring control of the station bus.

Moreover, the system configured to make switching from the original process bus communication to the station bus communication in the event of an error in the process bus as described above may be further provided with an error detection function (not shown) for the station bus. In this case, reliability in switching can be improved by including, in the switching condition, a condition that the station bus is normal. Moreover, a stop period for the station bus function can be shortened by adding a circuit (not shown) or the like implementing a function of automatically returning to the original state when the error is eliminated.

The first embodiment will be summarized with reference to FIG. 2 to FIG. 4 again. In a certain aspect, the first embodiment is directed to a process bus associated protective control system, including: a merging unit 10 that receives an analog signal indicating a measured state of a power system, that converts the analog signal into a digital signal, and that outputs a trip signal for controlling a circuit breaker provided in the power system; an IED 20, which is a calculation device that determines a state of the trip signal based on the digital signal converted by merging unit 10; a substation automation system device 46 that performs at least one of monitoring and instructing; a process bus PB that connects merging unit 10 and IED 20 to each other; and a station bus SB that connects merging unit 10, IED 20, and substation automation system device 46 to one another. Process bus PB and station bus SB are communication transmission paths independent from each other. IED 20 is configured to be capable of transmitting a trip instruction to merging unit 10 through both process bus PB and station bus SB, the trip instruction being for outputting the trip signal.

Preferably, as shown in FIG. 3, merging unit 10 includes: a first transmission/reception circuit 16 configured to be capable of receiving the trip instruction from IED 20 using process bus PB; a second transmission/reception circuit 17 configured to be capable of receiving the trip instruction from IED 20 using station bus SB; and a data processing unit 15 that switches, in response to occurrence of an error in process bus PB, the reception of the trip instruction from reception by first transmission/reception circuit 16 to reception by second transmission/reception circuit 17, and that performs a process that is based on the trip instruction.

Preferably, as shown in FIG. 3, second transmission/reception circuit 17 is configured to be capable of receiving control data from substation automation system device 46 using station bus SB. When data processing unit 15 switches the reception of the trip instruction from the reception by first transmission/reception circuit 16 to the reception by second transmission/reception circuit 17, data processing unit 15 stops the reception of the control data from substation automation system device 46 using station bus SB.

More preferably, as shown in FIG. 3 and FIG. 4, at least one of merging unit 10 and IED 20 includes an error detection circuit 25, 44 that detects an error in process bus PB. Error detection circuit 25, 44 reports occurrence of an error in process bus PB to substation automation system device 46 using station bus SB, and thereafter causes data processing unit 15 (or calculation unit 43) to stop the reception of the control data from substation automation system device 46 using station bus SB.

Preferably, first transmission/reception circuit 16 is configured to be capable of transmitting the digital signal to IED 20 using process bus PB. Second transmission/reception circuit 17 is configured to be capable of transmitting the digital signal to IED 20 using station bus SB. Data processing unit 15 switches, in response to occurrence of an error in process bus PB, the transmission of the digital signal from transmission by first transmission/reception circuit 16 to transmission by second transmission/reception circuit 17.

With such a configuration, the merging unit of the first embodiment has a function of making switching to the station bus when an error occurs in the process bus transmission. Hence, protection, which is a function important for system protection, and a control function for a circuit breaker or the like in accordance with a calculation result can be continued even in the case of an error in the process bus without providing two redundant process buses, advantageously.

Second Embodiment

The first embodiment provides the configuration such that when an error occurs in the process bus transmission, switching is made to the transmission attained via the station bus. On the other hand, in a second embodiment, there are provided means for transmitting a calculation result of IED 20 to the merging unit via the process bus and means for transmitting it to the merging unit via the station bus even in a normal state. Further, the process bus and the station bus are used without providing two redundant process buses for a control signal, and the merging unit receives control signals therefrom, drives different output contact points, and takes a logical sum or a logical product in a contact point circuit, thereby improving reliability.

Figure 5:
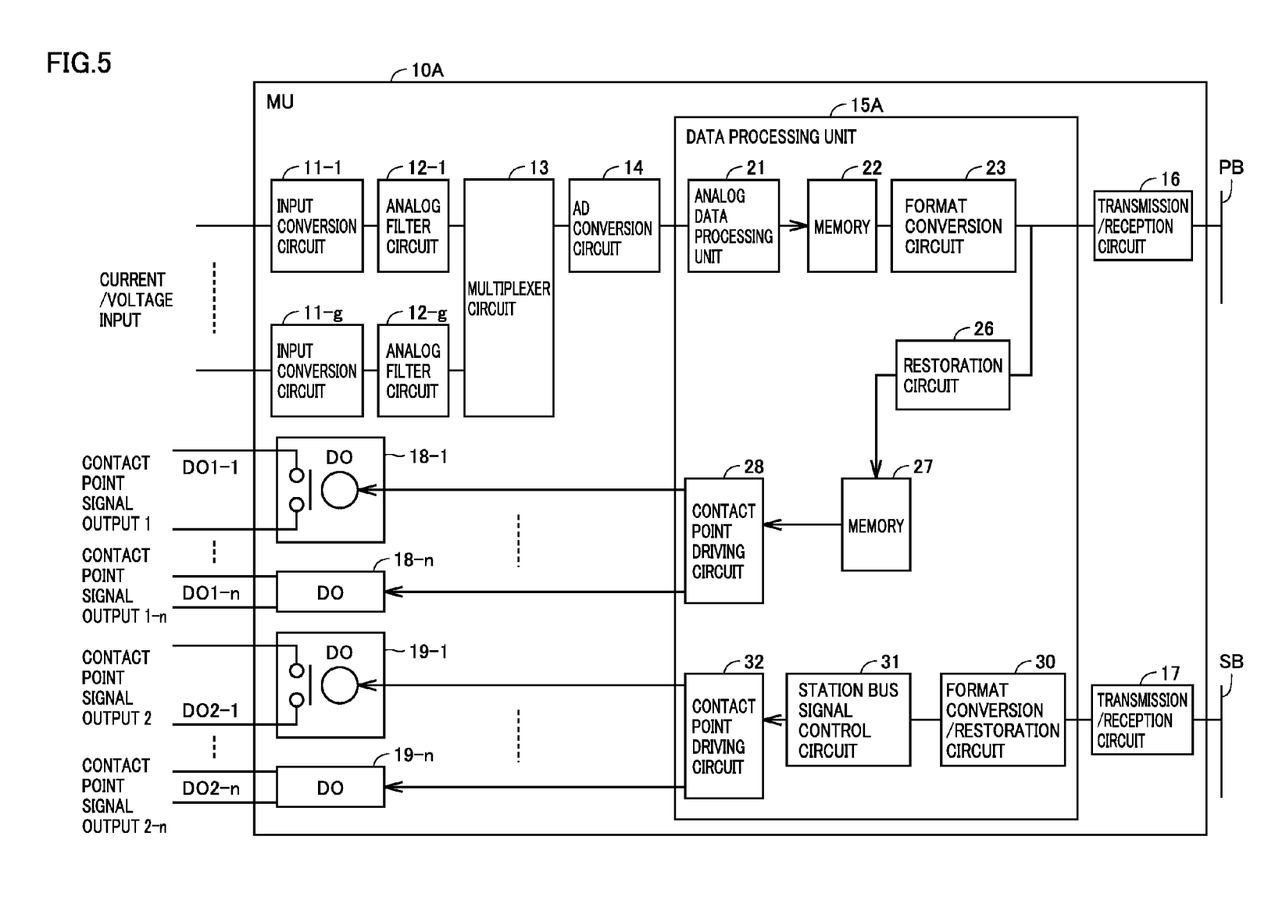
FIG. 5 is a block diagram showing a configuration of a merging unit 10A used in a second embodiment.

FIG. 5 is a block diagram showing a configuration of a merging unit 10A used in the second embodiment. In the second embodiment, merging unit 10A is used instead of merging unit 10 in FIG. 2.

Merging unit 10A of FIG. 5 is different from merging unit 10 of FIG. 3 in that merging unit 10A does not include transmission error detection circuit 25, and includes a data processing unit 15A instead of data processing unit 15, and further includes output contact point (DO) circuits 19-1 to 19-*n*. In FIG. 5, the same reference characters as those in FIG. 3 represent the same elements and description will not be repeated therefor. Data processing unit 15A includes no configuration for switching the data paths such as switching circuits 24, 29, unlike data processing unit 15 of FIG. 3.

When a result of calculation performed based on voltage/ current information received via process bus PB satisfies a predetermined condition, IED 20 of FIG. 2 transmits a control signal to merging unit 10A via process bus PB. In merging unit 10A, this signal is received by transmission/ reception circuit 16, and the control signal is recognized by restoration circuit 26 and is transmitted to contact point driving circuit 28 via second memory circuit 27. Contact point driving circuit 28 drives a predetermined output contact point (DO) circuit 18 (predetermined one of output contact points 18-1 to 18-*n*).

At the same time as described above, IED 20 of FIG. 2 also transmits the control signal to station bus SB. In merging unit 10A, the control signal from IED 20 is sent via transmission/reception circuit 17 and format conversion/ restoration circuit 30 and station bus control circuit 31 recognize, in accordance with the control signal, control for driving the output contact point. Station bus control circuit 31 causes contact point driving circuit 32 to drive a predetermined output contact point (DO) circuit 19 (predetermined one of output contact points 19-1 to 19-*n*).

In this way, the control signals from IED 20 are provided via both the process bus and the station bus to drive different output contact points respectively. Namely, the control signals from IED 20 are sent via different routes to drive independent output contact points. This contact point operation can be configured in view of reliability for system by taking a logical sum (contact points in parallel connection) or a logical product (series connection) outside merging unit 10A.

Figure 6:
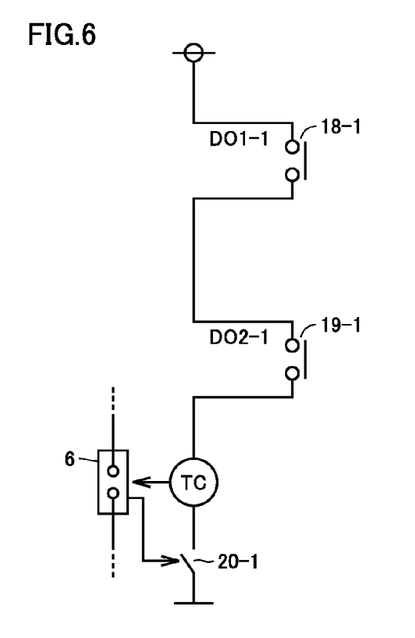
FIG. 6 is a circuit diagram showing an exemplary configuration when contact points are connected in series with each other.

FIG. 6 is a circuit diagram showing an exemplary configuration when the contact points are connected in series with each other. With reference to FIG. 6, contact points 18-1, 19-1 are connected in series with a trip coil TC and a separation contact point 20-1 connected in series with each other. FIG. 6 shows an example of taking the logical product of contact point signal outputs DO1-1, DO2-1 outside the merging unit, but the logical product of other corresponding contact point signal outputs DO1-*m*, DO2-*m* (m represents one of 1 to n) can be attained by circuits connected in series in a similar manner.

Figure 7:
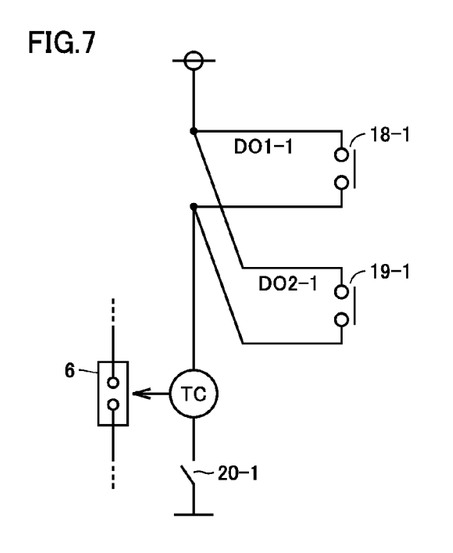
FIG. 7 is a circuit diagram showing an exemplary configuration when contact points are connected in parallel with each other.

FIG. 7 is a circuit diagram showing an exemplary configuration when the contact points are connected in parallel with each other. With reference to FIG. 7, contact points 18-1, 19-1 connected in parallel with each other are connected in series with trip coil TC and separation contact point 20-1 connected in series with each other. FIG. 7 shows an example of taking a logical sum of contact point signal outputs DO1-1, DO2-1 outside the merging unit, but a logical sum of other corresponding contact point signal outputs DO1-*m*, DO2-*m* (m represents one of 1 to n) can be attained by circuits connected in parallel in a similar manner.

With the series connection as shown in FIG. 6, the system can be configured such that even when a contact point is wrongly operated due to an instantaneous fault taking place on the process bus, a wrong operation is not caused eventually if there is no driving signal from the station bus. Moreover, with the parallel connection as shown in FIG. 7, the system can be configured such that even when a contact point cannot be operated due to instantaneous fault taking place on the process bus, the contact point can be operated using a driving signal from the station bus. Whether to employ the logical product or the logical sum outside can be selected as required.

The second embodiment will be summarized with reference to FIG. 2 and FIG. 5 again. In a certain aspect, the second embodiment is directed to a process bus associated protective control system, including: a merging unit 10A that receives an analog signal indicating a measured state of a power system, that converts the analog signal into a digital signal, and that outputs a trip signal for controlling a circuit breaker provided in the power system; an IED 20, which is a calculation device that determines a state of the trip signal based on the digital signal converted by merging unit 10A; a substation automation system device 46 that performs at least one of monitoring and instructing; a process bus PB that connects merging unit 10A and IED 20 to each other; and a station bus SB that connects merging unit 10A, IED 20, and substation automation system device 46 to one another. Process bus PB and station bus SB are communication transmission paths independent from each other. IED 20 is configured to be capable of transmitting a trip instruction to merging unit 10A through both process bus PB and station bus SB, the trip instruction being for outputting the trip signal.

Preferably, as shown in FIG. 5, merging unit 10A includes: a first transmission/reception circuit 16 configured to be capable of receiving the trip instruction from IED 20 using process bus PB; a second transmission/reception circuit 17 configured to be capable of receiving the trip instruction from IED 20 using station bus SB; and a data processing unit 15A that generates a first contact point driving signal based on the trip instruction received via first transmission/reception circuit 16 and that generates, along with the generation of the first contact point driving signal, a second contact point driving signal based on the trip instruction received via second transmission/reception circuit 17. By configuring the AND/OR circuit outside as shown in FIG. 6 and FIG. 7, circuit breaker 6 is controlled based on a combination of first contact point driving signal DO1-1 to DO1-*n* and second contact point driving signal DO2-1 to DO2-*n*.

Third Embodiment

In the second embodiment, the contact point output in accordance with the contact point control signal from the process bus and the contact point output in accordance with the contact point control signal from the station bus are configured outside the merging unit in accordance with the system required. On the other hand, in a third embodiment, the contact point outputs are configured using an internal logic by means of setting of AND and OR of both the signals sent via the process bus and the station bus.

Figure 8:
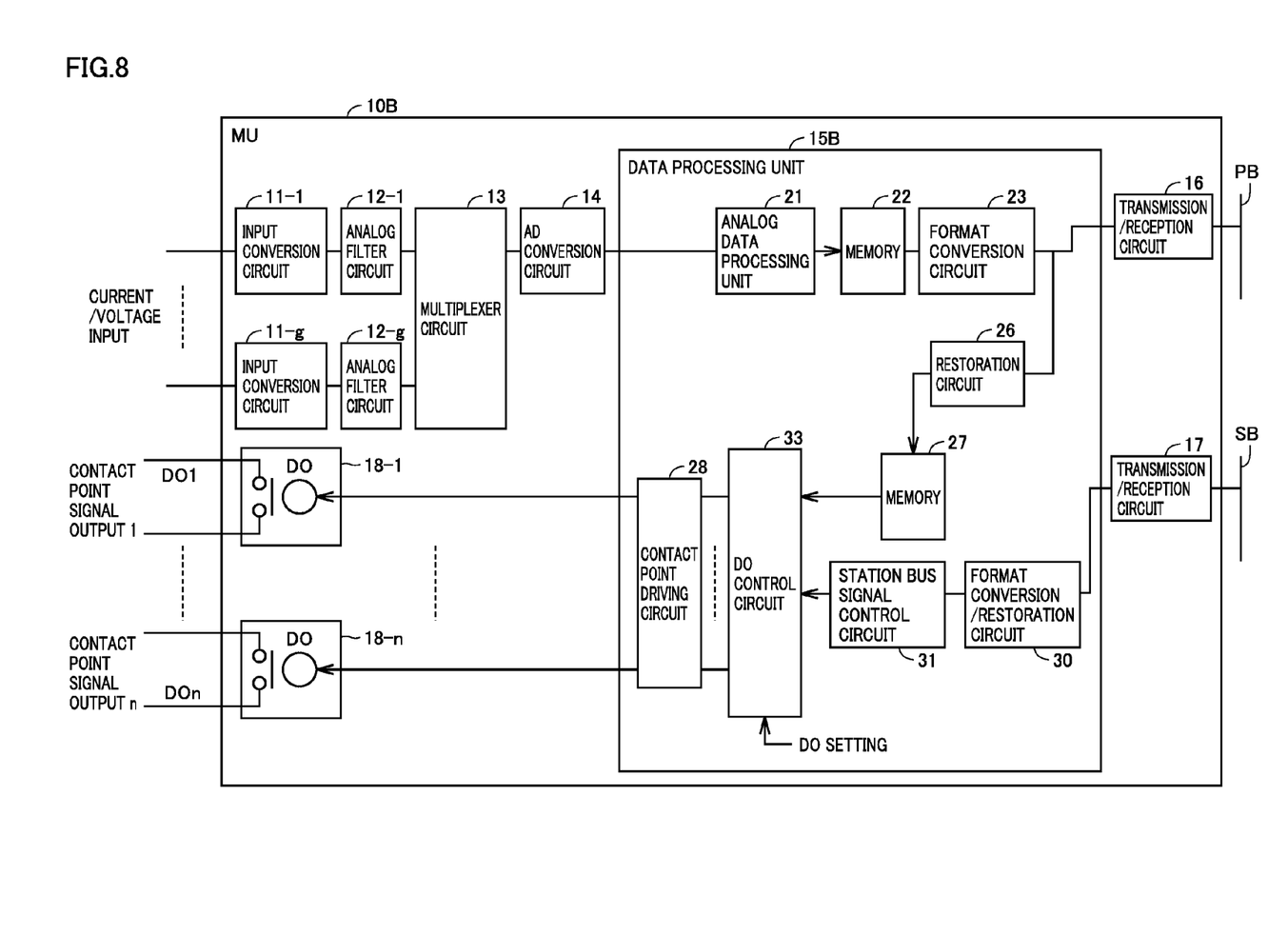
FIG. 8 is a block diagram showing a configuration of a merging unit 10B used in a third embodiment.

FIG. 8 is a block diagram showing a configuration of a merging unit 10B used in the third embodiment. In the second embodiment, merging unit 10B is used instead of merging unit 10 in FIG. 2.

Merging unit 10B of FIG. 8 is different from merging unit 10 of FIG. 3 in that merging unit 10B does not include transmission error detection circuit 25 and includes a data processing unit 15B instead of data processing unit 15. In FIG. 5, the same reference characters as those in FIG. 3 represent the same elements and description will not be repeated therefor.

The third embodiment will be described with reference to FIG. 8. As with the second embodiment, the contact point control signals from IED 20 are transmitted to merging unit 10B in the two routes, i.e., via process bus PB and via station bus SB, are then processed individually, and are sent to a DO control circuit 33. In DO control circuit 33, AND or OR control is performed for the signal sent via the process bus and the signal sent via the station bus. In accordance with the result thereof, contact point driving circuit 28 drives a predetermined contact point circuit of DO circuits 18-1 to 18-n.

Figure 9:
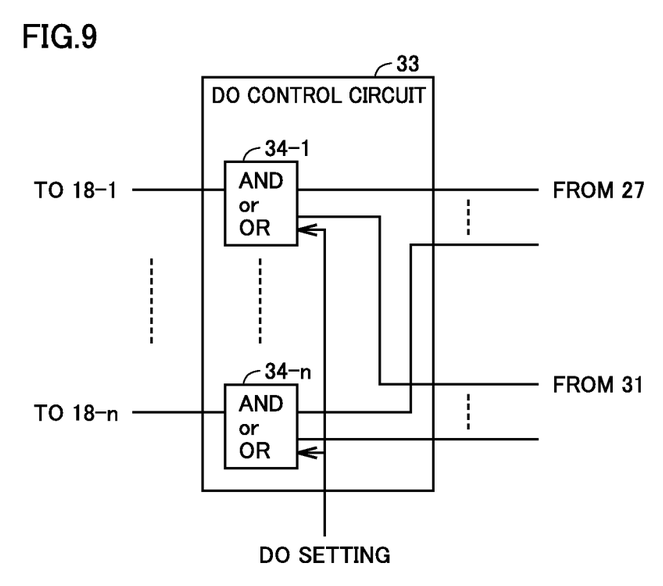
FIG. 9 shows a configuration of a DO control circuit 33 of FIG. 8.

FIG. 9 shows a configuration of DO control circuit 33 of FIG. 8. With reference to FIG. 9, DO control circuit 33 includes AND (or OR) circuits 34-1 to 34-n for calculation of corresponding ones of the control signals transmitted from memory 27 via process bus PB and the control signals transmitted from station bus control circuit 31 via station bus SB.

Each of AND (or OR) circuits 34-1 to 34-n is configured to be capable of changing between the AND process and the OR process in accordance with a DO setting signal in the merging unit. Each of the calculation results is transmitted to contact point driving circuit 28 of FIG. 8. The contact point driving circuit drives the predetermined output contact point based on the calculation result.

The third embodiment will be summarized with reference to FIG. 2 and FIG. 8 again. In a certain aspect, the third embodiment is directed to a process bus associated protective control system, including: a merging unit 10B that receives an analog signal indicating a measured state of a power system, that converts the analog signal into a digital signal, and that outputs a trip signal for controlling a circuit breaker provided in the power system; an IED 20, which is a calculation device that determines a state of the trip signal based on the digital signal converted by merging unit 10B; a substation automation system device 46 that performs at least one of monitoring and instructing; a process bus PB that connects merging unit 10B and IED 20 to each other; and a station bus SB that connects merging unit 10B, IED 20, and substation automation system device 46 to one another. Process bus PB and station bus SB are communication transmission paths independent from each other. IED 20 is configured to be capable of transmitting a trip instruction to merging unit 10B through both process bus PB and station bus SB, the trip instruction being for outputting the trip signal.

Preferably, as shown in FIG. 8, merging unit 10B includes: a first transmission/reception circuit 16 configured to be capable of receiving the trip instruction from IED 20 using process bus PB; a second transmission/reception circuit 17 configured to be capable of receiving the trip instruction from IED 20 using station bus SB; and a data processing unit 15B that generates a contact point driving signal used for control of circuit breaker 6, based on a first reception result of the trip instruction received via first transmission/reception circuit 16 and a second reception result of the trip instruction received via second transmission/reception circuit 17.

By configuring the merging unit in this way, the series or parallel connection outside the merging unit as required in the second embodiment does not need to be provided and the number of output contact point circuits can also be reduced.

[Modification]

Figure 10:
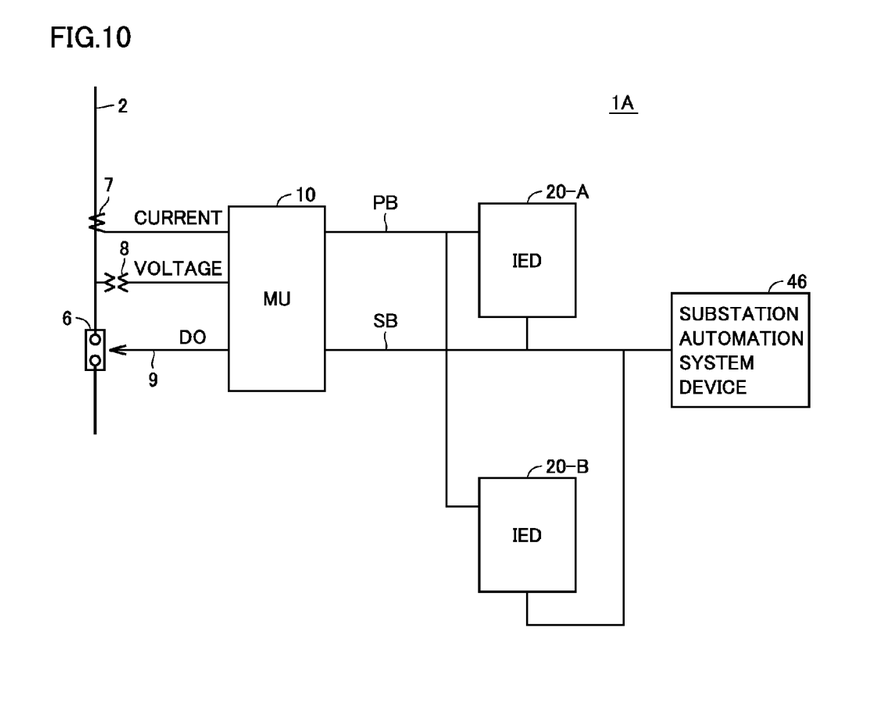
FIG. 10 shows a configuration of a modification of FIG. 2.

FIG. 10 shows the configuration of a modification of FIG. 2.

In each of the second and third embodiments, the same contact point control signals from IED 20 are transmitted to both the process bus and the station bus. However, it can be considered that a plurality of IEDs 20-A, 20-B are connected to process bus PB and station bus SB as shown in FIG. 10. In such a case, a contact point control signal from one IED 20-A is transmitted via process bus PB and a contact point control signal from the other IED 20-B is transmitted via station bus SB. Accordingly, the system can also be configured such that IED 20-A serves as an IED for main protection to perform control and communication via process bus PB and IED 20-B serves as an IED for fail safe or backup protection to transmit via station bus SB.

As described above, in the first embodiment, each of the merging unit and the IED includes the circuit for detecting an error in the process bus signal between the merging unit and the IED. When an error is detected, switching is made from the process bus communication path to the station bus communication path. That is, the station bus has a process bus function when there is an error in the process bus communication.

Moreover, in the second embodiment, the control signal for substation device is output from the merging unit to control opening and closing of the circuit breaker or the like provided in the power system. The control signal to be output from the merging unit is generated based on the current/voltage information transmitted from the merging unit to the IED via the process bus. When the result of calculation by the IED satisfies a predetermined condition, the control signal is transmitted from the IED to the merging unit via the process bus. When the merging unit receives the control signal, the merging unit drives the internal output contact point. At the same time, the IED transmits the same control signal to the merging unit via the station bus, and drives another, different output contact point. These output contact points are configured to be connected in series or parallel and a device, such as the circuit breaker, provided in the power system is controlled. In comparison to the control employing only the signal from the process bus, the signal sent via the station bus can be used even when there is a problem in the signal sent via the process bus, thus improving reliability more.

Further, in the third embodiment, the two control signals, i.e., the control signal transmitted from the IED to the merging unit via the process bus and the control signal transmitted from the IED to the merging unit via the station bus, are used to take a logical sum or logical product by means of the internal logic. Accordingly, reliability of control is improved in a manner similar to that in the second embodiment without providing two redundant contact point circuits.

It should be noted that, as shown in the modification, when the IED is constituted of the unit in which the main IED and the IED for fail safe are independent from each other, the control signal from the main IED may be transmitted to the merging unit via the process bus and the control signal from the IED for fail safe may be transmitted to the merging unit via the station bus (or vise versa). Further, when applying the configuration of the second embodiment in which different output contact points are driven in the merging unit or the configuration of the third embodiment in which the control signals are combined with each other by the internal logic, reliability of control can be improved in a similar manner.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: protective control system; 2: power transmission line; 3: potential transformer; 4: supply line; 5: bus; 6: circuit breaker; 7: current transformer; 8: instrument potential transformer; 10, 10A, 10B: merging unit; 11: input conversion circuit; 12: analog filter circuit; 13: multiplexer circuit; 14: conversion circuit; 15, 15A, 15B: data processing unit; 16, 17, 41, 42: transmission/reception circuit; 18-1 to 18-n, 19-1 to 19-n: output contact point circuit; 20: IED; 21: analog data processing unit; 22, 27: memory circuit; 23: format conversion circuit; 24, 29, 45, 48: switching circuit; 25, 44: transmission error detection circuit; 26, 30: restoration circuit; 27: memory; 28, 32: contact point driving circuit; 30: format conversion/restoration circuit; 31: station bus control circuit; 33: DO control circuit; 43: calculation unit; 46: substation automation system device; 47: station bus control processing unit; 50: remote monitoring control device; 51: remote control center; PB: process bus; SB: station bus; TC: trip coil.

The invention claimed is:

1. A process bus associated protective control system, comprising:
   a merging unit that receives an analog signal indicating a measured state of a power system, that converts said analog signal into a digital signal, and that outputs a trip signal for controlling a circuit breaker provided in said power system;
   a calculation device that determines a state of said trip signal based on said digital signal converted by said merging unit;
   a substation automation system device that performs at least one of monitoring and instructing;
   a process bus that connects said merging unit and said calculation device to each other; and
   a station bus that connects said merging unit, said calculation device, and said substation automation system device to one another,
   said process bus and said station bus being communication transmission paths independent from each other,
   said calculation device being configured to be capable of transmitting a trip instruction to said merging unit through both said process bus and said station bus, said trip instruction being for outputting said trip signal.

2. The process bus associated protective control system according to claim 1, wherein
   said merging unit includes
      a first transmission/reception unit configured to be capable of receiving said trip instruction from said calculation device using said process bus,
      a second transmission/reception unit configured to be capable of receiving said trip instruction from said calculation device using said station bus, and
      a data processing unit that switches, in response to occurrence of an error in said process bus, the reception of said trip instruction from reception by said first transmission/reception unit to reception by said second transmission/reception unit, and that performs a process that is based on said trip instruction.

3. The process bus associated protective control system according to claim 2, wherein
   said second transmission/reception unit is configured to be capable of receiving control data from said substation automation system device using said station bus, and
   when said data processing unit switches the reception of said trip instruction from the reception by said first transmission/reception unit to the reception by said second transmission/reception unit, said data processing unit stops the reception of said control data from said substation automation system device using said station bus.

4. The process bus associated protective control system according to claim 3, wherein
   at least one of said merging unit and said calculation device includes an error detection unit that detects an error in said process bus, and
   said error detection unit reports occurrence of an error in said process bus to said substation automation system device using said station bus, and thereafter causes said data processing unit to stop the reception of said control data from said substation automation system device using said station bus.

5. The process bus associated protective control system according to claim 2, wherein
   said first transmission/reception unit is configured to be capable of transmitting said digital signal to said calculation device using said process bus,
   said second transmission/reception unit is configured to be capable of transmitting said digital signal to said calculation device using said station bus, and
   said data processing unit switches, in response to occurrence of an error in said process bus, the transmission of said digital signal from transmission by said first transmission/reception unit to transmission by said second transmission/reception unit.

6. The process bus associated protective control system according to claim 1, wherein
   said merging unit includes
      a first transmission/reception unit configured to be capable of receiving said trip instruction from said calculation device using said process bus,
      a second transmission/reception unit configured to be capable of receiving said trip instruction from said calculation device using said station bus, and
      a data processing unit that generates a first contact point driving signal based on said trip instruction received via said first transmission/reception unit and that generates, along with the generation of said first contact point driving signal, a second contact point driving signal based on said trip instruction received via said second transmission/reception unit, and
   said circuit breaker is controlled based on a combination of said first and second contact point driving signals.

7. The process bus associated protective control system according to claim 1, wherein said merging unit includes
    a first transmission/reception unit configured to be capable of receiving said trip instruction from said calculation device using said process bus,
    a second transmission/reception unit configured to be capable of receiving said trip instruction from said calculation device using said station bus, and
    a data processing unit that generates a contact point driving signal used for control of said circuit breaker, based on a first reception result of said trip instruction received via said first transmission/reception unit and a second reception result of said trip instruction received via said second transmission/reception unit.

8. A merging unit that is included in a process bus associated protective control system, that receives an analog signal indicating a measured state of a power system, that converts said analog signal into a digital signal, and that outputs a trip signal for controlling a circuit breaker provided in said power system,
    said process bus associated protective control system including: a calculation device that determines a state of said trip signal based on said digital signal converted by said merging unit; a substation automation system device that performs at least one of monitoring and instructing; a process bus that connects said merging unit and said calculation device to each other; and a station bus that connects said merging unit, said calculation device, and said substation automation system device to one another,
    said process bus and said station bus being communication transmission paths independent from each other,
    said merging unit including
        a first transmission/reception unit configured to be capable of receiving a trip instruction from said calculation device using said process bus, said trip instruction being for outputting said trip signal,
        a second transmission/reception unit configured to be capable of receiving said trip instruction from said calculation device using said station bus, and
        a data processing unit that receives said trip instruction from at least one of said first transmission/reception unit and said second transmission/reception unit, and that performs control regarding interruption of said circuit breaker.

9. A calculation device included in a process bus associated protective control system,
    said process bus associated protective control system including: a merging unit that receives an analog signal indicating a measured state of a power system, that converts said analog signal into a digital signal, and that outputs a trip signal for controlling a circuit breaker provided in said power system; a substation automation system device that performs at least one of monitoring and instructing; a process bus that connects said merging unit and said calculation device to each other; and a station bus that connects said merging unit, said calculation device, and said substation automation system device to one another,
    said process bus and said station bus being communication transmission paths independent from each other,
    said calculation device including
        a first transmission/reception unit configured to be capable of transmitting a trip instruction to said merging unit using said process bus, said trip instruction being for outputting said trip signal,
        a second transmission/reception unit configured to be capable of transmitting said trip instruction to said merging unit using said station bus, and
        a calculation unit that generates said trip instruction based on said digital signal converted by said merging unit and that causes at least one of said first transmission/reception unit and said second transmission/reception unit to transmit said trip instruction to said merging unit.

* * * * *